United States Patent [19]
Thompson et al.

[11] Patent Number: 6,154,204
[45] Date of Patent: *Nov. 28, 2000

[54] TAP ANTENNA UNIT

[75] Inventors: John R. Thompson, La Quinta; Paul Darbee, Santa Ana; Michael Hanafee, San Clemente, all of Calif.

[73] Assignee: Evolve Products, Inc., Irvine, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/010,093

[22] Filed: Jan. 21, 1998

[51] Int. Cl.[7] .................................... H04N 7/173
[52] U.S. Cl. ................. 345/327; 348/8; 348/12; 348/734; 455/5.1
[58] Field of Search ............... 348/8, 9, 10, 12, 348/473, 734, 6, 11, 7, 13; 455/4.1, 5.1, 6.3, 11.1, 74, 66, 129, 3.1; 345/327; H04N 7/16, 7/173, 7/10

[56] References Cited

U.S. PATENT DOCUMENTS

| | | |
|---|---|---|
| 4,747,158 | 5/1988 | Goldberg et al. ................. 455/11 |
| 5,012,350 | 4/1991 | Streck et al. ..................... 358/335 |
| 5,163,159 | 11/1992 | Rich et al. ........................ 455/74 |
| 5,555,015 | 9/1996 | Aguayo, Jr. et al. .............. 348/6 |
| 5,608,446 | 3/1997 | Carr et al. ........................ 348/6 |
| 5,619,528 | 4/1997 | Rebec et al. ..................... 375/219 |
| 5,638,422 | 6/1997 | Roman ............................. 379/58 |
| 5,729,824 | 3/1998 | O'Neill et al. .................... 455/3.1 |
| 5,826,167 | 10/1998 | Jelinek et al. .................... 455/5.1 |
| 5,867,763 | 2/1999 | Dean et al. ....................... 455/5.1 |
| 5,870,134 | 2/1999 | Laubach et al. .................. 348/12 |

*Primary Examiner*—Chris Grant
*Attorney, Agent, or Firm*—Thomas R. Vigil

[57] ABSTRACT

The tap antenna unit includes signal splitting circuitry, coupled to a coaxial cable which is servicing a consumer electronic device, such as a television set, for splitting off a signal from the coaxial cable; a filter coupled to an output of the signal splitting circuitry for selecting a low-level sharp frequency band in the energy spectrum of the coaxial cable; circuitry for demodulating a signal carried by the low-level frequency band; circuitry for modulating the output signal onto a carrier in an unlicensed frequency band; and an output antenna which is coupled to the modulating circuitry and which is capable of transmitting the output modulated signal over a limited transmitting-receiving area.

13 Claims, 2 Drawing Sheets

TAP ANTENNA UNIT

BACKGROUND OF THE INVENTION

1. Field of the Invention

The present invention relates to a tap antenna unit which includes a signal wave splitter coupled to a television coaxial cable and having an output coupled to a filter, which can be a surface acoustic wave (SAW) filter capable of selecting a low-level but sharp frequency band somewhere in the energy spectrum of TV coaxial cable, such as for example 100–200 Khz wide, 40 dB down, located between 50–800 MHz. The signal is not carried in the video signal and is AM modulated with digital data at around 10 Kb per second and such digital data is remodulated onto a carrier signal in the unlicensed ISM band at 902–928 MHz, e.g. 916 MHz, and broadcast via a self-contained antenna to a receiving unit, such as a remote control.

Further, the present invention relates to a two-way tap antenna unit which can support two-way communication for devices in the home, such as a remote control, that can send 900 MHz data to the tap antenna. Such data is received by the tap antenna unit, demodulated, and then either remodulated onto the coaxial cable through a splitter/combiner at a frequency below 50 MHz, or provided at a connector as a baseband signal or sent through a processor or modem. In this way, equipment upstream from the tap antenna unit, or built into the tap antenna unit, can receive commands or data from devices in the home, such as a remote control.

2. Description of the Prior Art

Heretofore communication to a remote control has been through a telephone modem or from a cable box via IR signals. Further, it has been suggested to communicate with a remote control via radio signal. However, the use of a local transmitter or a local transceiver has not heretofore been proposed.

Also, heretofore the transmission of another signal within a video signal has been proposed. See the following U.S. Patents.

| Patent No. | Patentee |
| --- | --- |
| 4,807,031 | Broughton et al. |
| 4,920,503 | Cook |
| 5,200,822 | Bronfin et al. |
| 5,213,337 | Sherman |
| 5,251,301 | Cook |
| 5,539,471 | Myhrvold et al. |
| 5,572,247 | Montgomery et al. |
| 5,621,471 | Kim et al. |
| 5,655,945 | Jani |
| 5,666,293 | Metz et al. |
| 5,675,575 | Wall, Jr. et al. |
| 5,708,476 | Myhrvold et al. |

SUMMARY OF THE INVENTION

According to the present invention there is provided a tap antenna unit including signal splitting circuitry, coupled to a coaxial cable which is servicing a consumer electronic device, such as a television set, for splitting off signal from the coaxial cable; a filter coupled to an output of the signal splitting circuitry for selecting a low-level sharp frequency band in the energy spectrum of the coaxial cable; circuitry for demodulating a signal carried by the low-level frequency band; circuitry for modulating the output signal onto a carrier in an unlicensed frequency band; and an output antenna which is coupled to the modulating circuitry and which is capable of transmitting the output modulated signal over a limited transmitting-receiving area.

DESCRIPTION OF THE PREFERRED EMBODIMENT(S)

Figure 1:
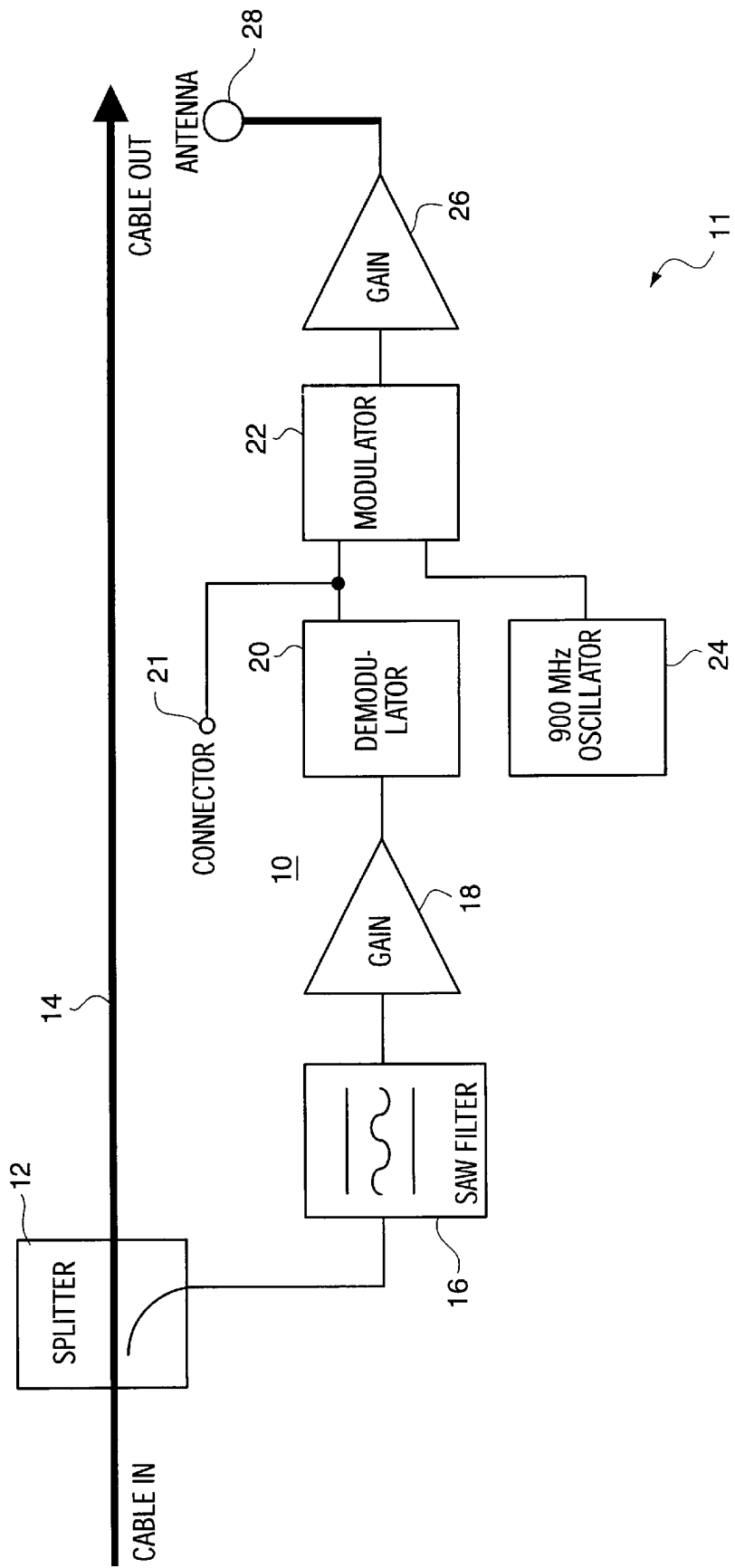
FIG. 1 is a block electrical schematic circuit diagram for a one way tap antenna unit constructed according to the teachings of the present invention.
Figure 2:
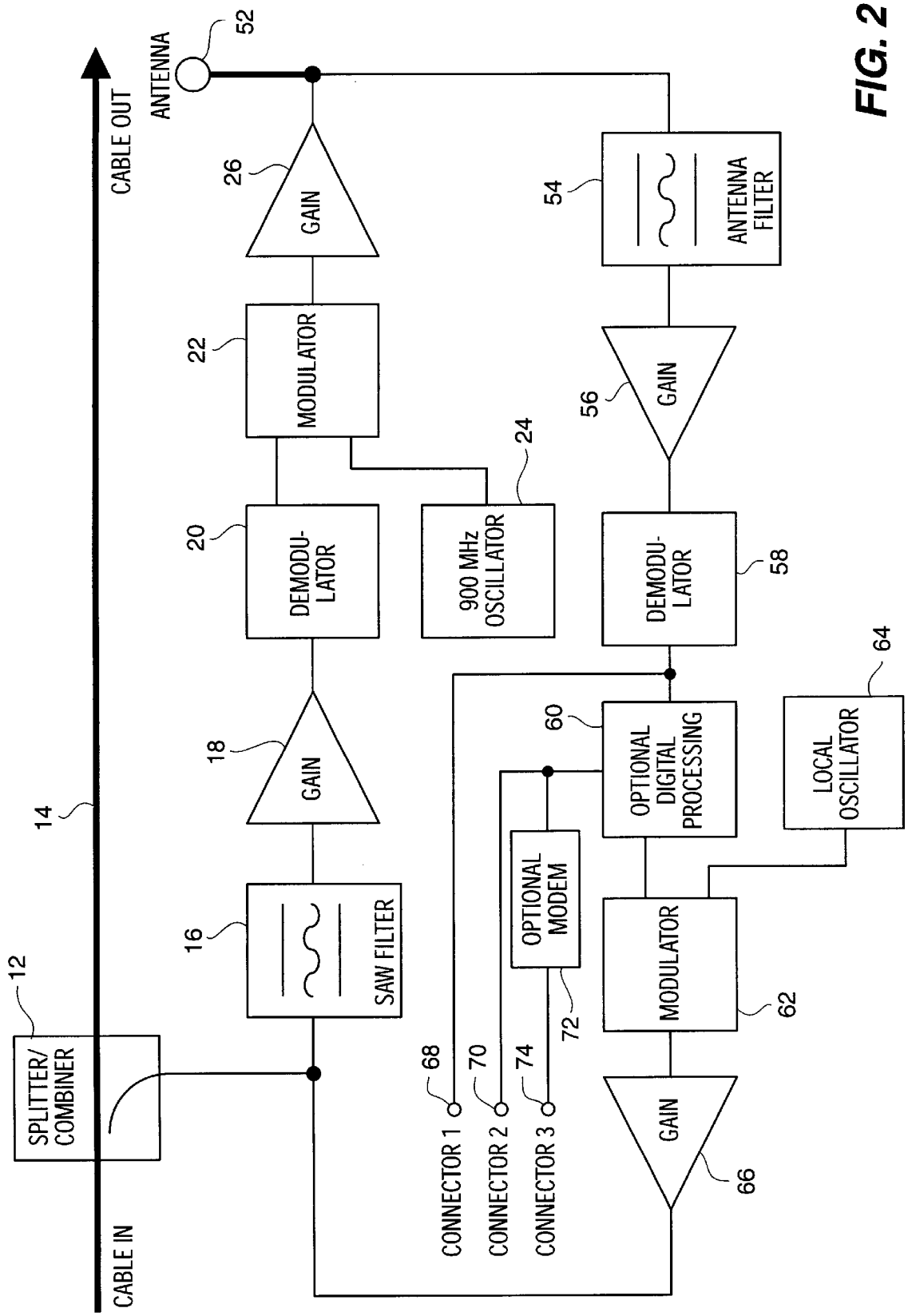
FIG. 2 is a block electrical schematic circuit diagram of a two way tap antenna unit constructed according to the teachings of the present invention.

Referring to FIG. 1, the present invention relates to a tap antenna unit 10 which can be a one way system (FIG. 1), or a two way system (FIG. 2). Circuitry 11 for a one way tap antenna unit 10 is illustrated schematically in FIG. 1 and includes a wave splitter 12 connected into a coaxial cable 14 going to a consumer electronic device, such as a television set. From the splitter 12, a signal split off from the cable 14 passes through a surface acoustic wave (SAW) filter 16 and then is amplified by an amplifier 18. The output of the amplifier 18 is fed to a demodulator 20 and the demodulator output is fed to a modulator 22.

Also connected to the modulator 22 is an oscillator 24 which can output a frequency of between 902–928 MHz and which is referred to as a 900 MHz (nominal) oscillator 24. Then, the signal is amplified again by an amplifier 26 and output through an antenna 28.

The SAW filter 16 is capable of selecting a low level but sharp frequency band somewhere in the energy spectrum of a TV coaxial cable 14, such as, for example, between 100–200 Khz wide, 40 dB down, and located between 50–800 MHz. Previously, this signal had been modulated with digital data at around 10 Kb per second. This data is demodulated by the demodulator 20 and then remodulated by modulator 22 onto a carrier such as a 900 MHz carrier and broadcast from the one way antenna 28.

The coaxial cable 14 is typically a 75 ohm coaxial cable with signals modulated on it up to 800 MHz. It is normally terminated with an F connector.

The source of the signal on the coaxial cable 14 can be a cable headend, an off-premises converter, a satellite, or MMDS LNB. In the case of an LNB, the signal is typically in the 200–400 MHz range.

The cable 14 out of the splitter 12 is also a 70 ohm coaxial cable which goes through to the TV, a VCR, a cable box, a satellite IRD or an MMDS IRD. The tap antenna unit 10 can be constructed with either an F connector or a short coaxial cable heading out of the unit 10.

The splitter 12 can be integrated with the SAW filter 16 and should have an insertion loss of less than 1.5 dB, flat across the bandwidth of the coaxial signal.

The SAW filter 16 is tuned to the center frequency of the tap antenna signal, with very sharp cutoff at the band edges.

The tap antenna signals from the tap antenna 28 can be located at the band edge of the TV channel, within a TV channel, or on an audio subcarrier of a TV channel, or elsewhere within the coaxial signal spectrum. It is AM, FM or phase modulated, at least 40 dB down from the main TV signal with AM modulation preferred for cost reasons.

The first amplifier 18 provides sufficient gain to boost the tap antenna signal enough to be conveniently AM demodulated.

The demodulator 20 is a simple AM detector, giving a digital baseband signal output. The digital output signal is a bitstream of about 10 Kb/s.

An optional connector 21 can directly input a digital bitstream from another device, such as a PC or a modem. In this case, the coaxial receiving circuitry may not be necessary.

The remodulator 22 and the 900 MHz (nominal) oscillator 24 are provided and tuned within the 902–928 MHz band. Its amplitude, frequency and phase characteristics are determined empirically.

The remodulator 22 is an AM or OOK type, designed within the constraints of unlicensed operation under FCC Part 15 regulations. Its electrical characteristics are determined empirically.

The second or output amplifier 26 drives the RF one way antenna 28 within the constraints of unlicensed operation under FCC Part 15 regulations. Its electrical characteristics are determined empirically.

At 900 MHz, the RF antenna 28 can be located within the tap antenna unit 10. The operating parameters of the unit 10, such as for example, the signal amplitude or signal strength is determined by the transmission area or the transmission distance required.

The digital data or data packet transmitted from the one way tap antenna 28 can be received and utilized by wireless operating devices in the home or office, such as for example, by a universal remote control. In this respect, the universal remote control can receive IR codes to control any kind of consumer electronic device now on the market or as developed in the future. Remote controls with displays can download program guide data, advertisements, text, games or executable codes.

Such remote controls with displays that are always on can be thought of as "billboards" on a coffee table, along with stand alone displays. Such a device which is adapted to be fixed to a surface, like a refrigerator magnet, is disclosed in U.S. application Ser. No. 08/829,928, filed Apr. 1, 1997 entitled WIRELESS ANNUNCIATOR WITH ADVERTISING DISPLAY and a TWO WAY REMOTE WITH ADVERTISING DISPLAY is disclosed in U.S. application Ser. No. 08/999,716, filed Oct. 6, 1997, the disclosures of which are incorporated herein by reference. These devices have a receiver for receiving signals from the one way antenna 28 constitute a new communication medium, namely a digital radio transmitter at the coaxial cable input to a TV, for feeding data to be displayed on screens of battery operated devices located throughout the home.

The tap antenna unit 10 can have a battery operated power supply for powering the various circuit elements of the tap antenna unit 10 or can have a transformer operated power supply which is energized from AC power supplied to the TV set (or other consumer electronic device) or simply plugged into a conventional A.C. wall socket in a home.

Turning now to FIG. 2, there is illustrated therein a two way tap antenna unit 50 including a two way antenna 52 and all of the elements shown in FIG. 1. In addition, the tap antenna unit 50 includes an antenna filter 54 coupled to the two way antenna 52. The antenna filter 54 can be of the SAW type and is tuned to the center frequency of the signal sent by the battery operated device or devices in the home. The precise frequency response curves are determined from the operating parameters of the unit 50, such as, for example, signal strength and the transmission area or the transmission distance required.

The incoming signal is amplified by a third amplifier 56 and then the output of the amplifier 56 is supplied to a demodulator 58. The gain of the amplifier 56 is sufficient to boost the level of incoming signals from the two way tap antenna 52 enough so that it can be conveniently demodulated.

The demodulator 58 is a simple AM or FSK type giving a digital baseband signal output. The digital signal output is a bitstream of about 10 Kb per second. This baseband signal can optionally be supplied at connector 68.

Optional data processing can be provided by an optional data processing unit 60 and can serve two important functions:

1. It can determine which of several devices in the home (or neighboring homes), is sending signals to the unit and therefore whether the tap antenna unit 50 should act on the signal.

2. It can manage the upstream traffic to the coaxial cable 14 or to connector 70. This traffic is often scheduled, or polled, using a protocol determined by upstream.

Accordingly, it is very likely that digital processing will be included in the digital processing unit 60 of the tap antenna unit 50. An optional connector 70 can provide one or two-way digital communication between the digital processing unit 60 and other equipment, such as a PC, to which it is connected.

An optional modem 72, which can be a telephone modem, a coaxial cable modem or a network interface, is located between the digital processing unit 60 and the connector 74, to provide a connection to the telephone, to a coaxial cable or to another network, such as a digital cable network or a local area network.

The output of the data processing unit 60 is supplied to a modulator 62 which has associated therewith a local oscillator 64 which is tuned to the upstream signaling band of the cable 14, typically under 50 Mhz. Its exact amplitude, frequency and phase characteristics are determined from the operating parameters of the tap antenna unit 50, such as, for example, signal strength and the transmission area of the transmission distance required.

The modulator 62 receives the output from the optional digital processing unit 60 and from the local oscillator 64 and the type of modulation depends on the upstream signaling requirements of the cable system. Again, its electrical characteristics depend upon the signal strength and the transmission area or the transmission distance required.

Finally, the output signal from the oscillator 64 is amplified to provide a signal of sufficient strength to submit to the coaxial cable 14. Its electrical characteristics depend on the cable system requirements.

From the foregoing description, it will be apparent that the one way tap antenna unit 10 and the two way tap antenna unit 50 of the present invention have a number of advantages, some of which have been described above and others of which are inherent in the invention. Also, modifications can be made to the tap antenna unit 10 or 50 without departing from the teachings of the invention. Accordingly, the scope of the invention is only to be limited as necessitated by the accompanying claims.

We claim:

1. In combination, one of a wireless remote control device or a wireless information presentation device and a tap antenna unit including signal splitting means, coupled to a coaxial cable which is servicing a consumer electronic device for splitting off a non-telephone, low frequency band signal from the coaxial cable; a filter coupled to an output of said signal splitting means for selecting a low-level sharp frequency band in the energy spectrum of the coaxial cable; means for demodulating a digital data signal carried by said low-level frequency band to a demodulated digital output signal; means for modulating the digital output signal onto a carrier in an unlicensed frequency band; and an output antenna which is coupled to said modulating means for transmitting the output modulated signal over a limited transmitting-receiving area to a display device of one of said remote control device or said information presentation device without the use of a routing terminator.

2. The tap antenna unit of claim 1 including an amplifier for amplifying the signal from said filter that is supplied to said demodulating means.

3. The tap antenna unit of claim 1 including an amplifier for amplifying the modulated output signal which includes a carrier signal within the unlicensed data frequency band having digital data superimposed thereon.

4. The tap antenna unit of claim 1 wherein said signal splitting means also includes signal combining means and said unit further includes an antenna filter coupled to said antenna and second demodulating means coupled to the output of said antenna filter to act as a demodulator coupled to the input of second modulating means which also receives a carrier frequency from a local oscillator which is tuned to the upstream signaling band of the coaxial cable typically, under 50 Mhz, said second modulating means being coupled to said signal splitting and combining means coupled to the coaxial cable.

5. The tap antenna unit of claim 4 wherein said second modulating means is connected to an amplifier which is connected to the coaxial cable through said splitting means.

6. The tap antenna unit of claim 4 wherein a digital processing unit is coupled between said second demodulating means and said second modulating means.

7. The tap antenna unit of claim 4 wherein an amplifier is coupled between said antenna filter and said second demodulating means.

8. The tap antenna unit of claim 1 wherein said demodulated digital output signal is a bit stream of about 10 KB per second.

9. A method of transmitting a local area signal carried in by a coaxial cable connected to a consumer-electronic device to one of a wireless remote control device or a wireless information presentation device, said method including the steps of: splitting off a non-telephone, low frequency band signal from a coaxial cable; filtering the split off signal for selecting a low level sharp frequency band in the energy spectrum of the coaxial cable; demodulating a digital data signal carried by the low level frequency band to a demodulated digital output signal; modulating the output signal from the demodulator onto a carrier signal having a frequency in an unlicensed frequency band and outputting said signal in a local area via an antenna to a display device of one of the wireless remote control device or the wireless information presentation device without the use of a routing terminator.

10. The method of claim 9 including the further steps of receiving, via the antenna a signal from a local transmitter situated within the local area and broadcast in the unlicensed frequency band; filtering the signal received, demodulating the filtered signal; remodulating the signal from a local oscillator which is tuned to the upstream signaling band of the coaxial cable, typically a carrier signal under 50 Mhz; and supplying said remodulated signal to the coaxial cable connected to the antenna.

11. The method of claim 10 including the step of digitally processing the demodulated signal before remodulating the demodulated signal.

12. The method of claim 11 wherein the digital processing includes determining whether the signal received is from a particular unit within range and, if so, transmitting such signal to the coaxial cable.

13. The method of claim 9 wherein said demodulated digital output signal is a bit stream of about 10 KB per second.

\* \* \* \* \*